United States Patent [19]
Tajiri et al.

[11] Patent Number: 5,895,621
[45] Date of Patent: *Apr. 20, 1999

[54] METHOD FOR MANUFACTURING A STEERING WHEEL PAD

[75] Inventors: Kazunari Tajiri; Soji Nimura, both of Aichi-ken, Japan

[73] Assignee: Toyoda Gosei Co., Ltd., Aichi-Ken, Japan

[*] Notice: This patent is subject to a terminal disclaimer.

[21] Appl. No.: 08/953,662

[22] Filed: Oct. 17, 1997

Related U.S. Application Data

[60] Continuation of application No. 08/721,627, Sep. 26, 1996, Pat. No. 5,728,344, which is a division of application No. 08/405,022, Mar. 16, 1995, Pat. No. 5,603,968.

[30] Foreign Application Priority Data

Apr. 28, 1994 [JP] Japan .................. 6-092520

[51] Int. Cl.⁶ .................................................. B29C 45/44
[52] U.S. Cl. .................. 264/318; 249/64; 264/328.1; 264/334; 425/556; 425/DIG. 58
[58] Field of Search .......................... 264/318, 334, 264/328.1; 425/DIG. 58, 556, 577, 438; 249/63, 64

[56] References Cited

U.S. PATENT DOCUMENTS

| | | | |
|---|---|---|---|
| 3,865,529 | 2/1975 | Guzzo | 425/DIG. 58 |
| 4,044,092 | 8/1977 | Spears | 264/318 |
| 4,618,121 | 10/1986 | Conti | 425/DIG. 58 |
| 4,854,849 | 8/1989 | Sudo | 425/DIG. 58 |
| 5,053,182 | 10/1991 | Hedgewick | 264/334 |
| 5,281,127 | 1/1994 | Ramsey | 425/DIG. 58 |
| 5,536,161 | 7/1996 | Smith | 264/318 |
| 5,603,968 | 2/1997 | Tajiri et al. | 264/318 |
| 5,609,894 | 3/1997 | Rathbun | 264/334 |
| 5,728,344 | 3/1998 | Tajiri et al. | 264/318 |

FOREIGN PATENT DOCUMENTS

| | | | |
|---|---|---|---|
| 4137358 | 5/1992 | Germany. | |
| 57-93129 | 6/1982 | Japan | 425/318 |
| 58-110228 | 6/1983 | Japan | 425/438 |
| 58-134726 | 8/1983 | Japan | 425/438 |
| 6-114898 | 4/1994 | Japan | 425/556 |
| 1691119 | 11/1991 | U.S.S.R. | 425/556 |

*Primary Examiner*—Jill L. Heitbrink
*Attorney, Agent, or Firm*—Pillsbury Madison & Sutro LLP

[57] ABSTRACT

A method for manufacturing an injection molded steering wheel pad having a cover and a pocket formed between a first projection and a second hook-spaced projection, that together hold an arm of an airbag device. The pad includes a pad body and at least one pair of holding portions extending from the pad body. The holding portions have an L-shaped first recess and the steering wheel pad has a second recess located between the pad body and the holding portion. A mold includes a pair of first and second molds. The method comprises injecting a molten resin into a mold cavity defined upon closing contact between the first and second molds, curing the molten resin to form the steering wheel pad, separating the first and second molds and holding the steering wheel pad in either one of the first and second molds, extending the first and second core members from the main body of one of the first and second molds together with the steering wheel pad, sliding the first core member in a direction perpendicular to the extending direction and resiliently deforming the holding portion to remove the first core member from the first recess while holding the pad with the second core member, and removing the pad from the second core member.

7 Claims, 10 Drawing Sheets

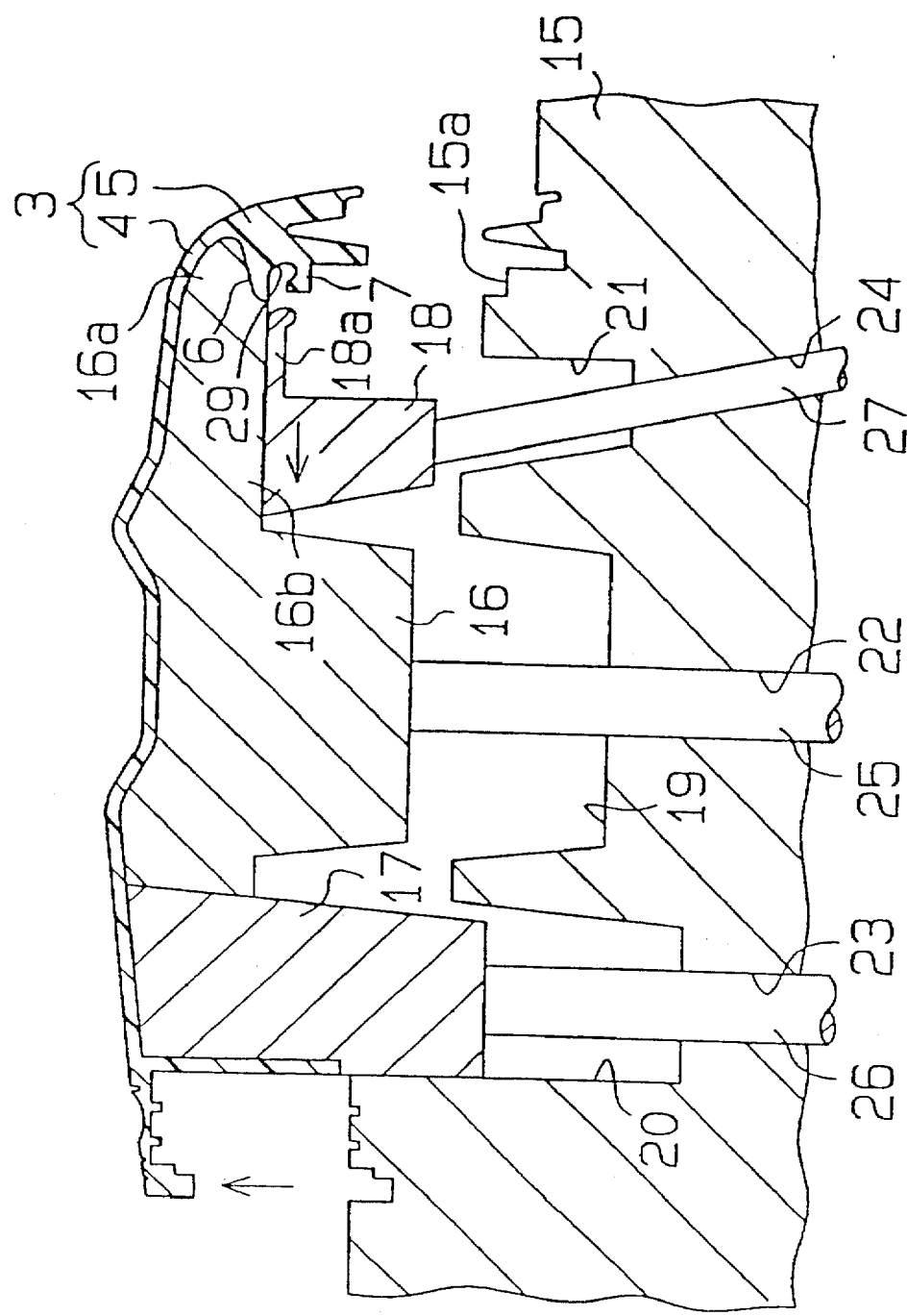

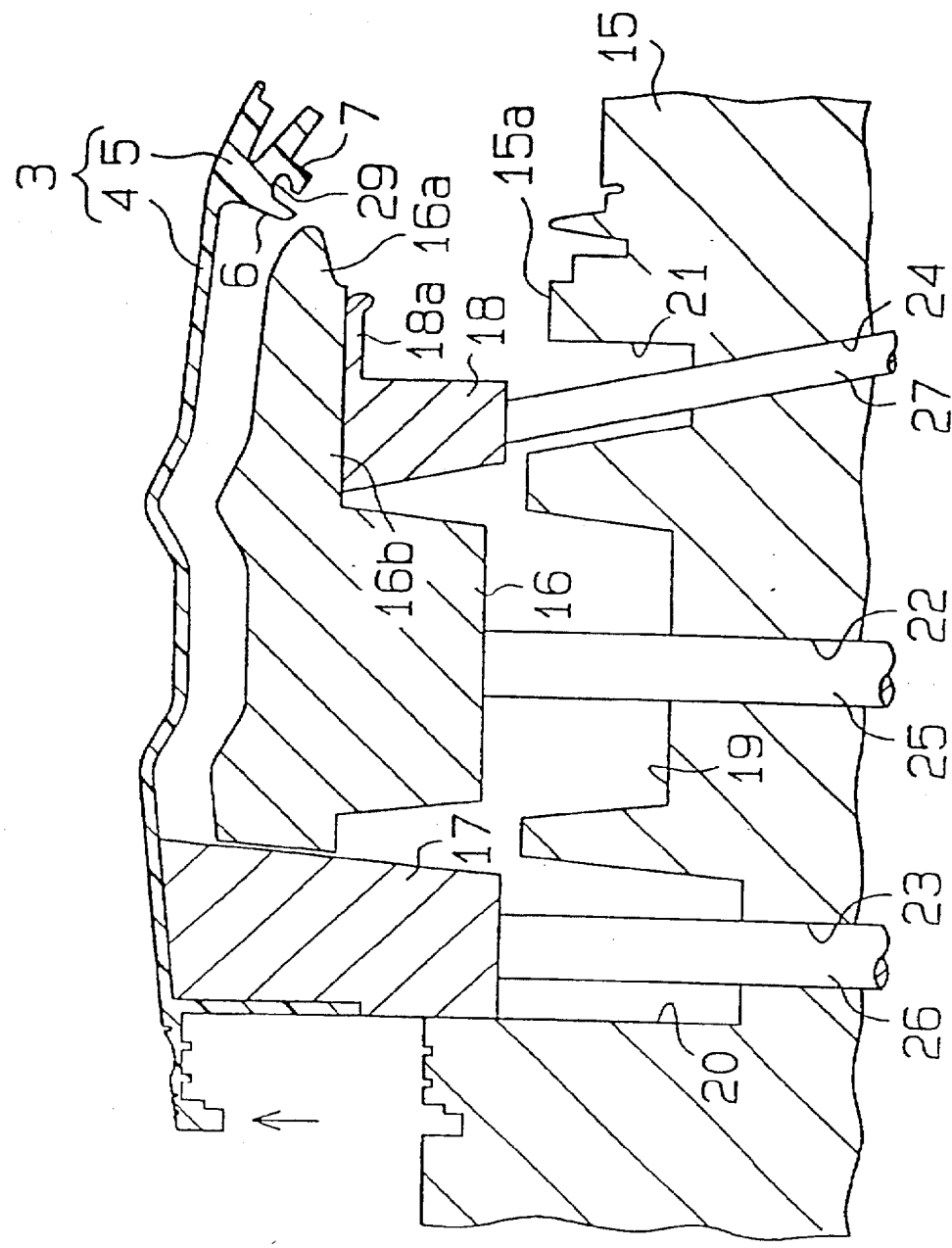

METHOD FOR MANUFACTURING A STEERING WHEEL PAD

This application is a continuation of application Ser. No. 08/721,627, filed Sep. 26, 1996, now U.S. Pat. No. 5,728,344, which is a division of application Ser. No. 08/405,022, filed Mar. 16, 1995, now U.S. Pat. No. 5,603,968.

BACKGROUND OF THE INVENTION

1 Field of the Invention

The present invention relates to an apparatus for manufacturing a steering wheel pad and a method for manufacturing therefor.

2 Description of Related Art

Steering wheels with pads for accommodating air bags are widely used. Such pads are injection molded, using a resin material, into a configuration enabling the accommodation of air bags therein.

More particularly, as shown in FIG. 10, a known steering wheel pad body 32 includes a pocket 35a for securing a metal fitting 42 of an air bag device generally indicated at 43. The pocket 35a is defined between a first upper projection 34 and a hook-shaped second lower projection 35 both extending inwardly from the inner wall of the pad body 32.

A conventional mold 36, described with reference to FIGS. 8 and 9, is utilized to manufacture the conventional steering wheel pad 31 having two projections 34 and 35, which differ from each other in shape. The mold 36 comprises a fixed mold half 37, a movable mold half 38 which moves relative to mold half 37, and a pushing core 39 extensible along a moving path of mold half 38. The core 39 has a first protrusion 39a, a second protrusion 39b, and a depression "D" between the two protrusions 39a, 39b to form the two projections 34, 35 and the pocket 35a on the pad body 32.

For manufacturing the pad 31, a cavity 40 is first defined by moving the movable mold half 38, with the core 39 disposed therein, to a position close to the fixed mold half 37. Molten resin is then injected into the cavity 40 to thereby form the pad 31. Afterwards, the mold half 38 and the core 39 are separated from the mold 37. Subsequently, the pad 31 is separated from the mold half 37.

As shown in FIG. 9, the core 39 is separated from the mold half 38 to push the pad 31 out from the mold half 38. A lateral force is then applied to a bottom portion 33 of the body 32 by an operator's hand 41. This lateral force resiliently bends the bottom portion 33 to separate the second and first projections 35, 34 from the associated protrusions 39b, 39a, respectively, and thus permits the pad 31 to be separated from the core 39.

However, the above-described operation requires the operator to repeatedly apply force to bend the pad body 32 when removing the pad 31 from the core 39. This makes the manufacturing operation tiresome for the operator.

SUMMARY OF THE INVENTION

The objective of the present invention is to provide a steering wheel pad manufacturing apparatus and a simplified method for manufacturing a steering wheel pad, compared to those of the prior art, as discussed above.

To achieve the above objective, an apparatus for manufacturing a steering wheel pad is provided. The pad is formed by resin injection molding so as to have a cover and a pocket portion defined between a first projection and a second hook-shaped projection. The pocket portion holds an arm of an air bag device accommodated in the pad.

The apparatus has a first and second mold portions, such as a fixed mold half and a movable mold half which opposes the fixed mold half. The movable mold half is adapted to move along a predetermined path to selectively contact and separate from the fixed mold half. The apparatus further has a plurality of core members which are movable between retracted and extended positions with respect to one of the movable and fixed mold halves. The core members define a molding cavity along with the movable and fixed molds halves, when the core members are in their retracted position.

In particular, the core members include a first core member, for forming the first projection of the pad, which is movable along a predetermined moving path. At least one second core member and at least one third core member are also provided, the latter for forming the second projection of the pad.

According to another aspect of the present invention a method for manufacturing a steering wheel pad is proposed. The pad is formed by injecting a resin into a cavity to form a cover and a pocket between a first projection and a second hook-shaped projection for holding an arm of an air bag device accommodated in the pad. Then, by selectively extending and retracting the core members, the steering wheel pad can be separated from the mold apparatus without requiring an operator to exert manual force therefor.

First, the pad is formed by injecting a molten resin into a cavity defined by a fixed mold half and an opposed movable mold half. One of the mold halves includes the first, second and third core members, each being movable between a retracted position and an extended position with respect to of the mold halves. Each of the core members is held in its retracted position at this stage.

Second, the movable mold half is moved along a predetermined moving path to separate it from the fixed mold half while the core members are maintained in their retracted position. The pad is held on the core members and the movable mold half;

Third, the core members are selectively extended and retracted so that pad becomes disengaged from the mold half and released. To accomplish this, each of the first and second core members are moved along the predetermined path, to an extended position and then the third core members are moved in a direction obliquely to and intersecting the predetermined path, whereby the pad is separated from the mold and the second projection is separated from the third core member(s);

Fourth, the second and third core members are retracted, during which time the second core members are moved in a direction along the moving path of the moveable mold half, and the first projection of the pad is separated from the second core member; and Finally, the first core member is retracted so that the pad is separated from the first core member.

Other objects, features, and characteristics of the present invention, as well as methods of operation and function of the related elements of structure, and the combination of parts and economies of manufacture, will become more apparent upon consideration of the following detailed description and the appended claims with reference to the accompanying drawings, all of which form a part of this specification.

BRIEF DESCRIPTION OF THE DRAWINGS

The present invention, may best be understood by reference to the following description of the presently preferred embodiments together with the accompanying drawings, in which:

FIG. 2 is a partial cross-sectional view showing the second step in which a second projection of the steering wheel pad is separated from an inclined core member;

FIG. 3 is a partial cross-sectional view showing a third step in which a first projection of the steering wheel pad is separated from a first core member;

DETAILED DESCRIPTION OF PREFERRED EMBODIMENTS

An embodiment according to the present invention will now be described with reference to the drawings.

Figure 6:
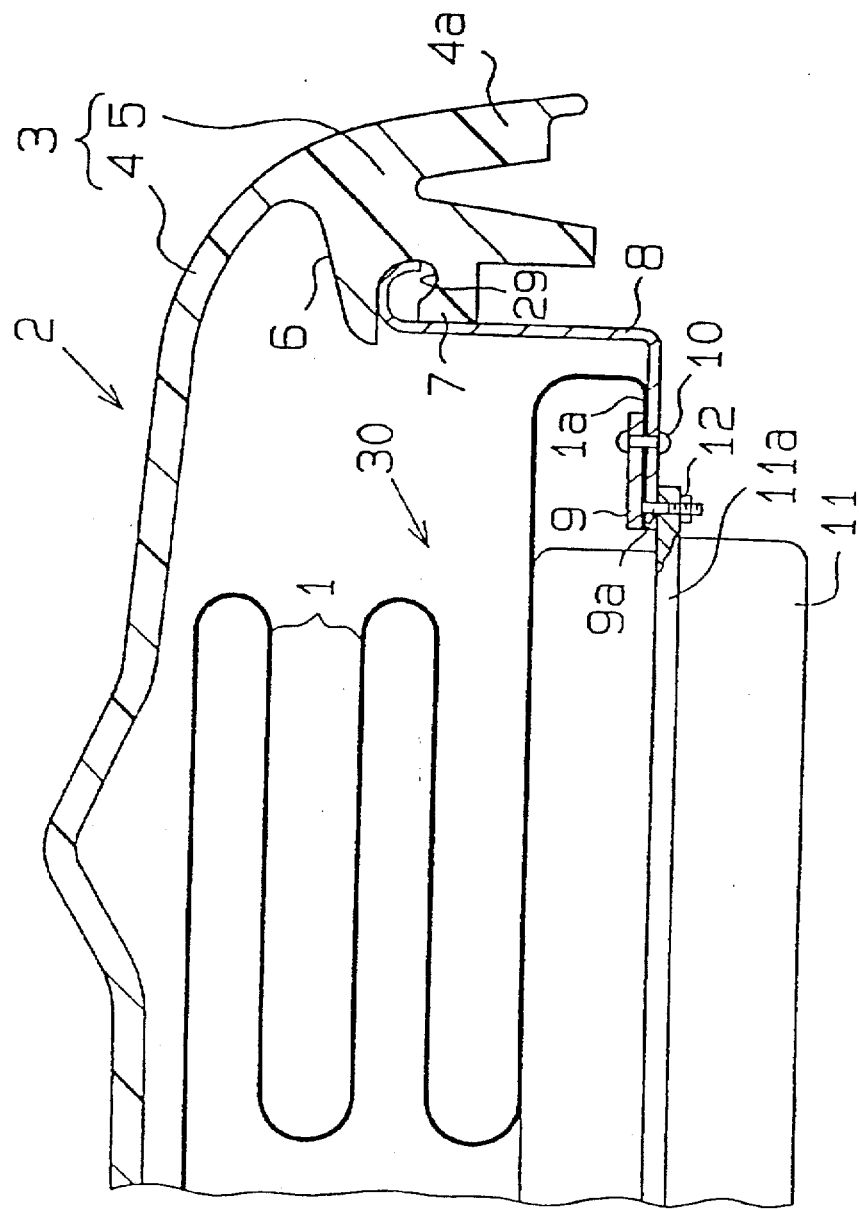
FIG. 6 is a partial cross-sectional view showing a steering wheel with an air bag device therein.

FIG. 6 illustrates a portion of a steering wheel 2 with an air bag device 30 accommodated therein. The steering wheel 2 has a pad 3. The pad 3 includes a central cover 4 having an open bottom. The cover 4 has side walls provided with holding portions 5 integrally formed on the inner side thereof. The holding portions 5 serve to hold the air bag device 30 in place and are thicker than cover 4.

Each holding portion 5 includes a first upper projection 6 and a second hook-shaped lower projection 7, both extending inwardly. A pocket 29 is defined between the two projections 6, 7. Further, projections 6, 7 are generally perpendicular to a predetermined path of a movable mold 15 (seen in FIGS. 1(a) and 1(b)).

The pad 3 is preferably made from an elastomer, such as a high polymer having rubber-like elasticity under normal temperatures. SEBS (styrene-ethylene-butadiene-styrene copolymer), for example can be used as the elastomer. Accordingly, pad 3 easily deforms under the application small stresses and returns quickly to its original configuration when the stress is removed.

The air bag device 30 comprises a main air-bag body 1 and an inflator 11 which supplies inflating gas to the air bag body 1. The air bag body 1 and the inflator 11 are attached to the holding portion 5 via, for example, a bag holder 8, a retainer 9, rivets 10, and nuts 12. More particularly, the top end of the bag holder 8 is engagingly inserted into a pocket 29. The bottom end of the bag holder 8, an open end 1a of the air bag body 1, and the retainer 9 are all held on a flange 11a of the inflator 11. Legs 9a project downward through the open end 1a of the air bag body. The legs 9a, the bag holder 8, and the flange 11a are each fastened by nuts 12. The retainer 9, open end 1a, and bag holder 8 are also secured in sandwiched manner by rivets 10.

Figure 1A:
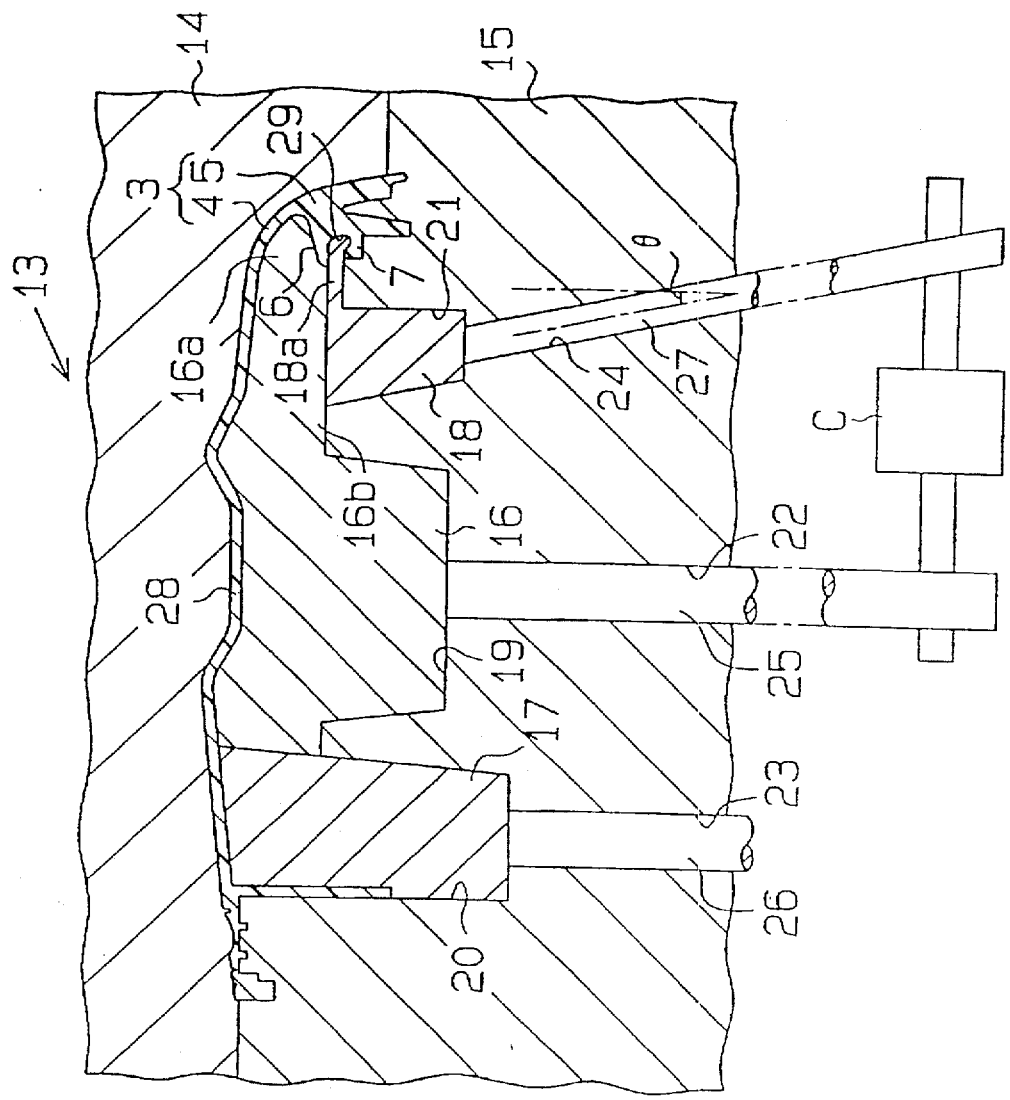
FIG. 1(a) is a cross-sectional view taken along the line I—I of FIG. 7 showing a first step according to the present invention, in which a cavity of a mold is filled with molten resin.
Figure 1B:
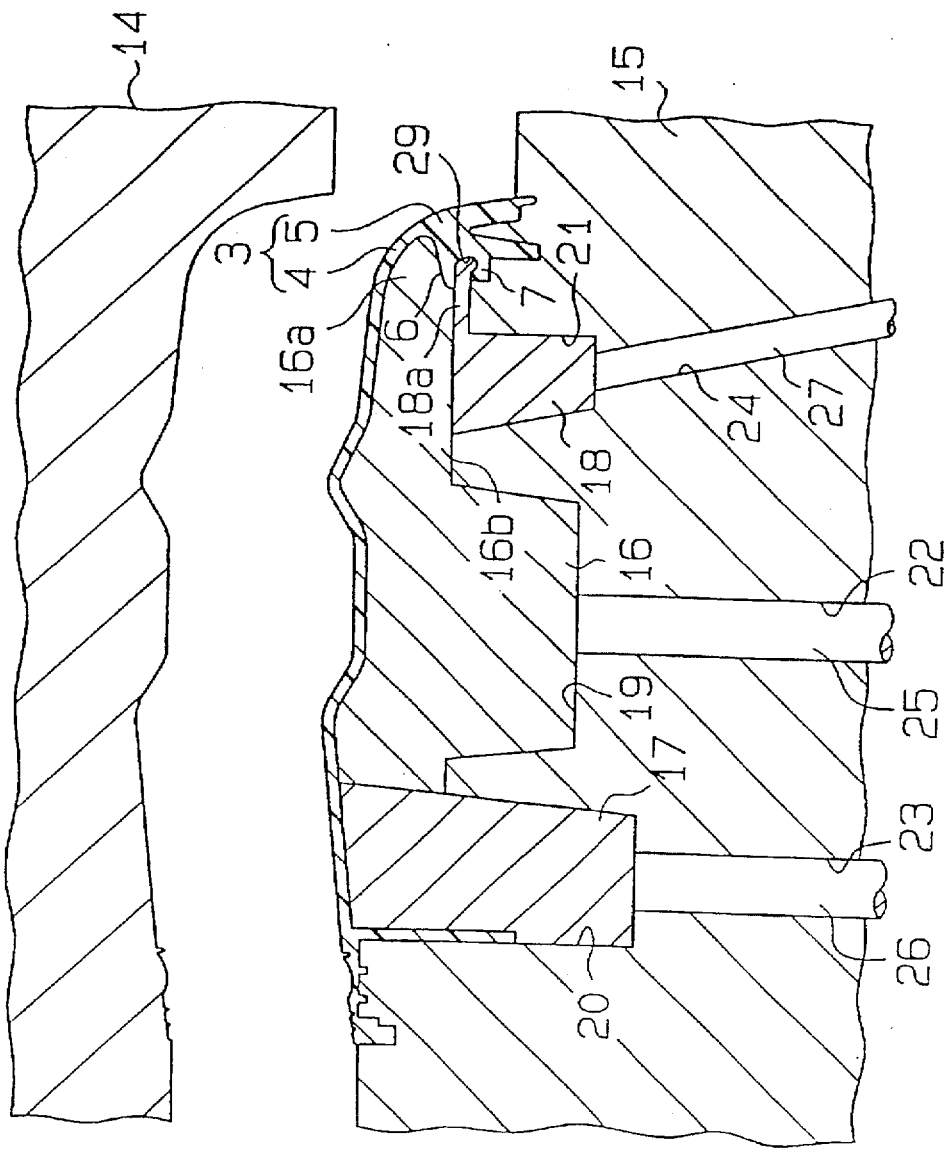
FIG. 1(b) is a cross-sectional view showing the movable mold half separated from the fixed mold half.
Figure 7:
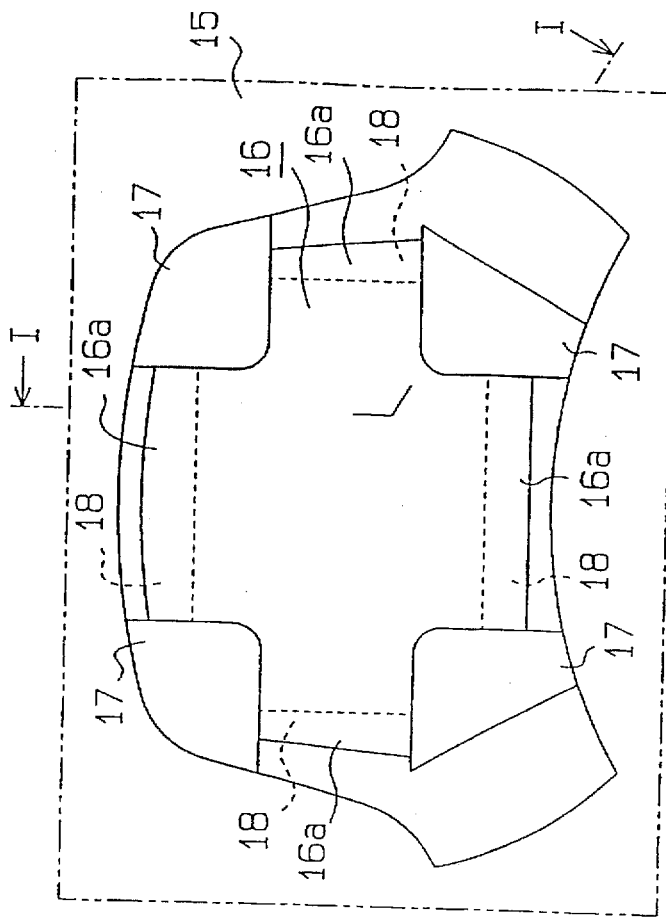
FIG. 7 is a partial plan view showing a movable half mold, two core members, and an inclined core member.
Figure 8:
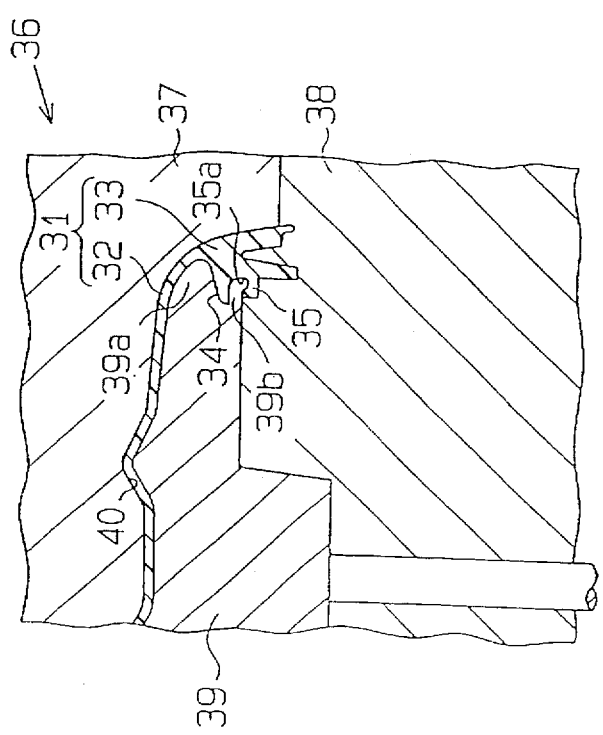
FIG. 8 is a partial cross-sectional view illustrating a cavity of a conventional mold filled with molten resin.
Figure 9:
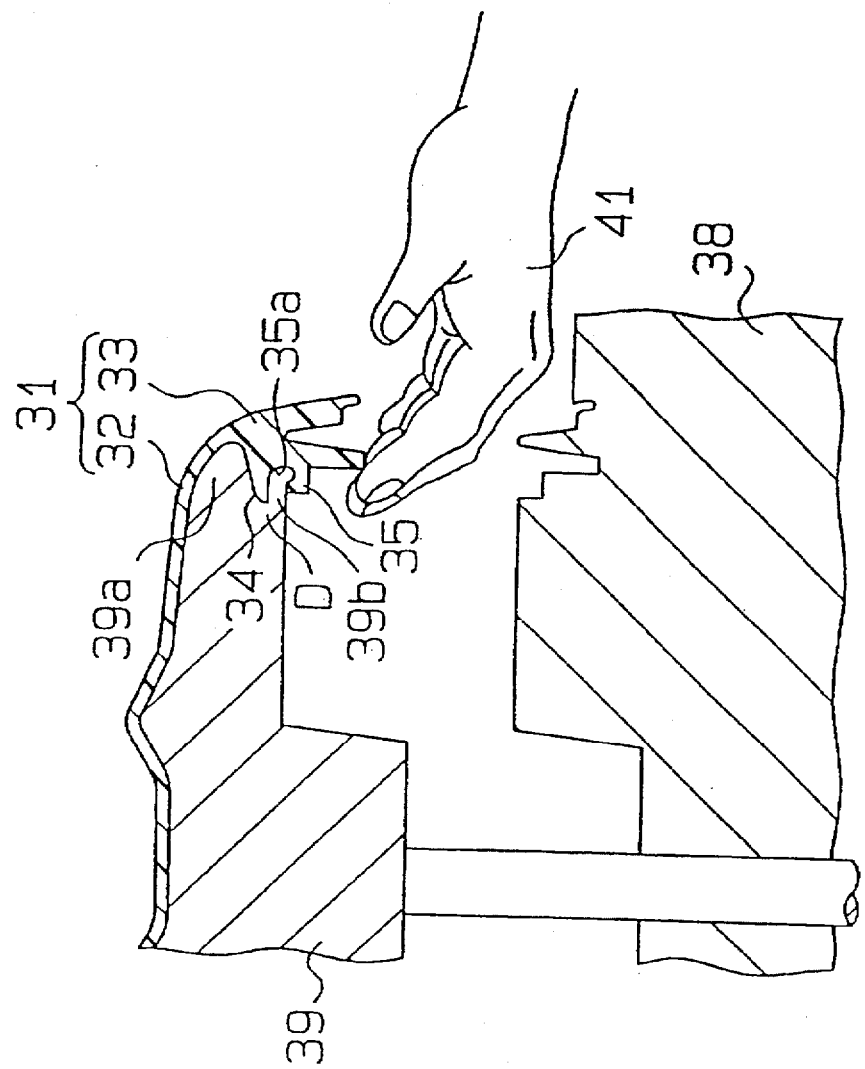
FIG. 9 is a partial cross-sectional view showing a pad separated from the conventional core member of FIG. 8.
Figure 10:
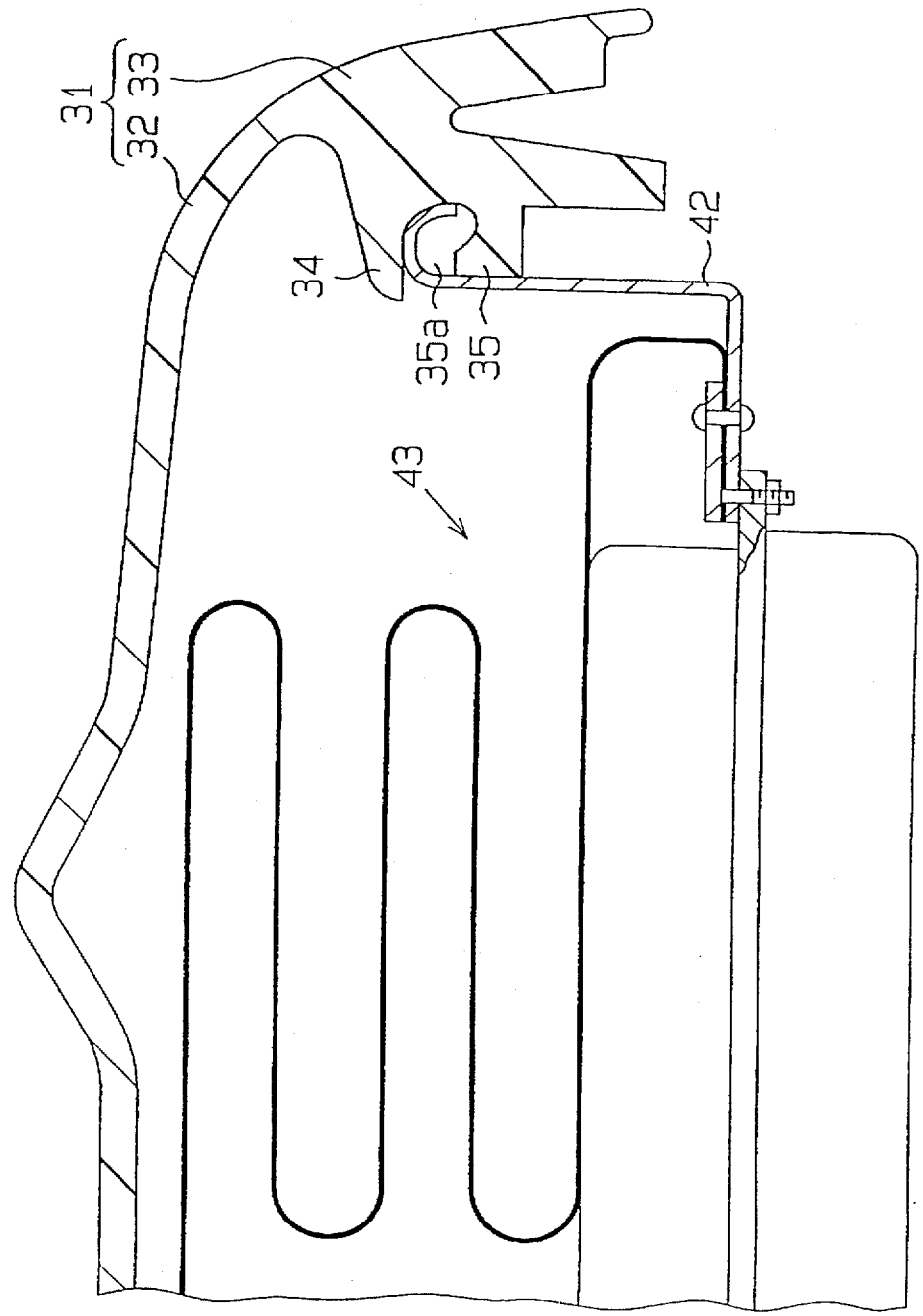
FIG. 10 is an enlarged partial cross-sectional view of a conventional metal fitting for mounting an air bag.

To manufacture the above-described pad 3, the molding apparatus 13 shown in FIGS. 1(a), 1(b) and 7 is utilized. The mold apparatus 13 comprises a fixed mold half 14, a movable mold half 15, a first core member 16, four second core members 17, and four inclining core members 18.

The movable mold half 15 is typically moved vertically by a conventional drive mechanism (not shown) connected to the mold half 15. In this instance, the movable mold half 15 approaches the fixed mold half 14 when moving upward, and is separated there from when moving downward. On the upper section of the mold half 15, a number of recesses are provided for receiving various core members including a recess 19 for accommodating the first core member 16, four recesses 20 for accommodating second core members 17, and four recesses 21 for accommodating inclining core members 18.

The movable mold half 15 also includes rod passages 22, 23 that extend vertically through the mold half 15 and communicate with recesses 19, 20. The mold half 15 also includes four rod passages 24, each being inclined, with respect to the predetermined moving path of the mold half 15, at a designated angle θ. Each rod passage communicates with an associated recess portion 21.

The first core member 16 is fixed to a top of a push rod 25 which is slidably inserted into passage 22. The first core member 16 is provided with a protrusion 16a. Protrusion 16a extends outwardly and is generally perpendicular to the predetermined movement path of mold half 15. The core member 16 fits into the recess 19 when the core member 16 is in a lower, retracted position within mold half 15. Core member 16 is disposed above the recess 19 when the core member 16 is in a projected position outside the mold half 15 as in FIGS. 2–4.

The second core members 17 are fixed to the tops of push rods 26, respectively. Each of the rods 26 are slidably inserted into an associated rod passage 23. Each core member 17 fits into an associated recess 20 when the core member is in a retracted position within the mold half 15. The core members 17 will abut against the first core member 16 when the core member 17 are in a retracted position as in FIG. 1(a). The core members 17 project from the recess 20 when they are in a position outside the mold 15.

The inclined third core members 18 are each fixed to the top of one of the inclined push rods 27, respectively. Each push rod 27 is slidably inserted into an associated rod passage 24. Each third core member 18 has a second protrusion 18a. The protrusion 18a is generally perpendicular to the predetermined movement path of the mold half 15. Each third core member 18 fits in a respective recess 21 when the core member 18 is in a retracted position within the mold half 15. In their retracted positions, core members 18 abut against the bottom surface 16b of the first core member 16. Also, each core member 18 is disposed above the recess 21 when the core members 18 are in a projected position. Since each rod 27 slides upward at an inclined angle to lift core members 18 to the projected position, core members 18 also move inwardly in a direction oblique to the predetermined movement path of core member 16, as shown in FIG. 2.

The lower end portions of rods 25, 27 are connected to each other by a connecting member C. This connection allows movement of core members 16 and 18 to be synchronized while keeping core members 18 abutting against the bottom 16b of core member 16.

As shown in FIG. 1(a), a cavity 28 is defined by mold halves 14, 15 when the movable mold half 15 closes with the fixed mold half 14 and with all core members 16, 17, 18 being in their respective retracted positions.

The first projection 6 of pad 3 is formed between the first and second protrusions 16a, 18a, respectively. The second projection 7 of pad 3 is formed between second protrusion 18a and a step portion 15a (see FIG. 2) formed on the surface of movable mold half 15.

A method for manufacturing the pad 3, utilizing the above apparatus, will now be explained by the following sequence of steps.

In the first step as illustrated in FIGS. 1(a) and 1(b), core members 16, 17, 18 begin in their retracted positions and accommodated in their respective recesses 19, 20, 21. The movable mold half 15 is then moved upward to engage the fixed mold half 14. When mold half 15 comes into partial contact with mold half 14, a cavity 28 is defined between the mold halves 14, 15 and the core members 16, 17, 18. Molten resin (e.g., SEBS) is then injected into cavity 28 and cooled, thus forming a steering wheel pad 3 having the desired configuration.

The first projection 6 of pad 3 is formed between the first protrusion 16a of first core member 16 and protrusions 18a. The second projection 7 is formed between the protrusion 18a of each inclining core member 18 and mold 15.

In the second step, the movable mold half 15 and the core members 16, 17, 18 are first separated from the fixed mold half 14. This movement causes pad 3 to be separated from mold half 14 and moved downward, integral with mold half 15 and core members 16, 17, 18.

Then, with reference now to FIG. 2, core members 16, 17, 18 are simultaneously moved upward from the movable mold half 15. The pad 3 is thereby separated from mold half 15 and the core members 16, 17, 18 are extended from their respective recesses 19, 20, 21. The extended axis of the inclined rods 27 intersect the movement path of mold half 15. This enables core member 18 to move inwardly in a direction opposite to the direction of extension of second projection 7. The pad 3 is still held by core members 16, 17 and is, therefore, constrained from moving. Accordingly, the second protrusion 18a of core member 18 is separated from pocket 29 formed on the interior surface of pad 3.

In the third step, as shown in FIG. 3, the upward movement of the first and inclining core members 16, 18 is stopped. However, each of the second core 17 members continue moving upward. The pad 3, supported by core members 17, thus moves upwardly along with them.

Although the second projection 7 of the pad 3 was separated from the inclining core members 18, the first projection 6 remains engaged with protrusion 16a of the first core member 16 during the second step. However, during the third step, the holding portion 5 of the pad is gradually deflected due to its elasticity when the pad 3 is pushed upwardly by second core members 17. Hence, projection 6 is bent away from and separated from protrusion 16a. Afterwards, the holding portion 5 returns to its original configuration because of its own resiliency.

Figure 4:
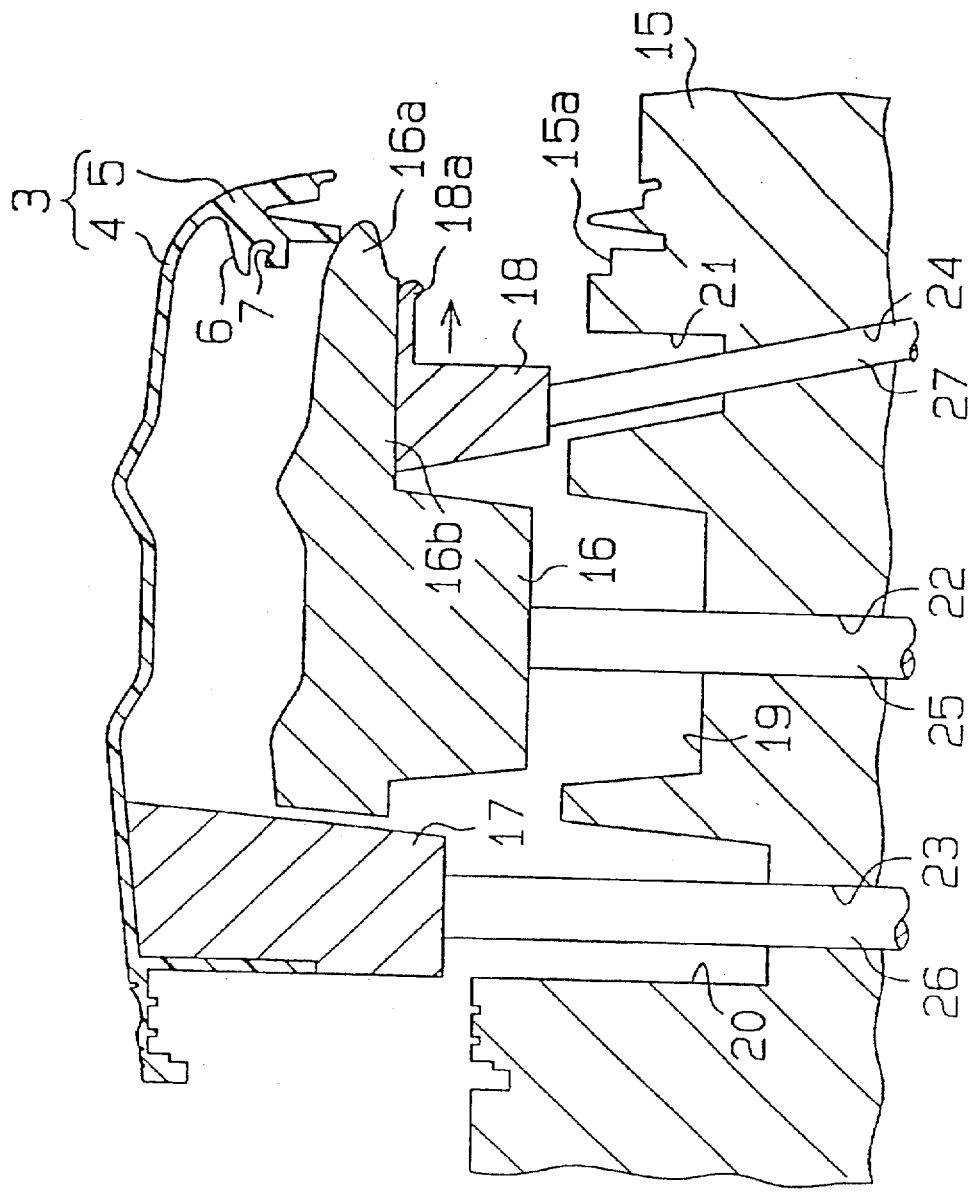
FIG. 4 is a partial cross-section view showing a second pushing core member moved upward from the position shown in FIG. 3.
Figure 5:
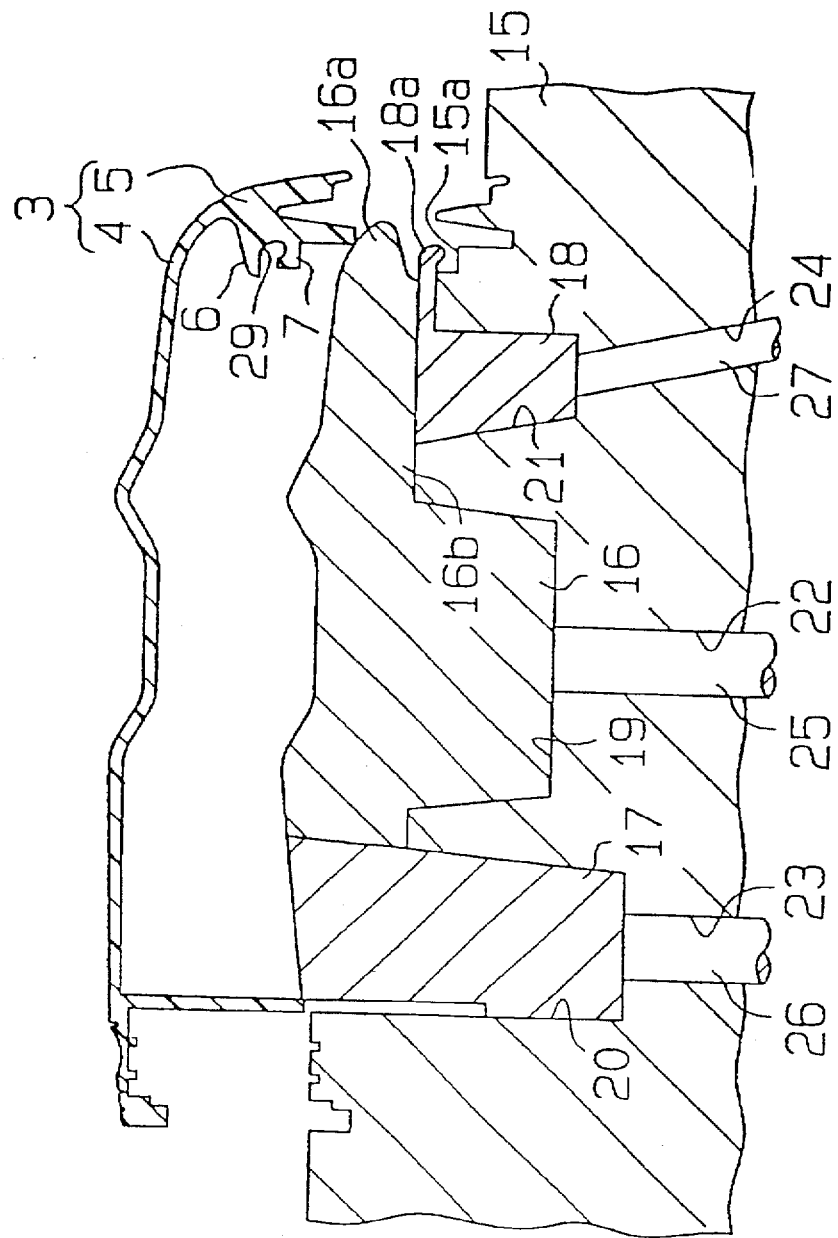
FIG. 5 is a partial cross-sectional view illustrating a fourth step in which a pad is separated from the second core member.

In the fourth step, the second core members 17, which support pad 3, are moved down from the position shown in FIG. 4. During the downward movement of core members 17, the simultaneous downward movement of the pad 3 is restricted when holding portion 5 contacts the protrusion 16a. This produces an upward force on that side of pad 3 counter to the force on the opposite side created by the downward movement of core members 17. These opposing forces separate the pad 3 from core members 17. After core member 17 is further retracted, the core members 16, 17, 18 move downward together and again fit into their associated recesses 19, 20, 21, as shown in FIG. 5.

Finally, an extracting mechanism (not shown) is separately provided to remove pad from the mold 13.

Although only one embodiment of the present invention has been described herein, it should be apparent to those skilled in the art that the present invention may be embodied in many other specific forms without departing from the spirit or scope of the invention. Particularly, it should be understood that the present invention may be embodied in the modes given below.

(1) A different type of a mold half with a movable mold which moves horizontally may be employed. In this case, the pad may be dropped freely after being separated from the mold, thus making it possible to omit the extracting mechanism.

(2) In the third step of the above embodiment, only the second core members 17 are moved upward after the first and inclining core members 16, 18 are stopped. On the other hand, the second core members 17 may be stopped and the remaining core members 16, 18 may be moved downward. The significant feature is that pad 3 is supported by core members 17 while core member 16 moves away downwardly from pad 3 thereby establishing countering separating forces. This can be accomplished by suitable relative movement between the core members 16, 17.

(3) In the fourth step of the above embodiment, while the core members 17 are moving down, the downward movement of the 3 may be regulated by having pad 3 contact core member 18, or portions other than the protrusion 16a, on core member 16.

(4) In the fourth step, core members 16 and 18 could be moved upward instead of having core members 17 move downward.

(5) The core members 16, 17, 18 could be retracted and projected from the fixed mold half 14 instead of from the movable mold half 15.

While the invention has been described in connection with what is presently considered to be the most practical and preferable embodiments, it is to be understood that the invention is certainly not limited to these disclosed embodiments, but, on the contrary, is intended to cover various modifications and equivalent arrangements included within the spirit and scope of the appended claims.

What is claimed is:

1. A method for manufacturing a steering wheel pad by injection molding using a mold, the pad including a pad body, a holding portion extending from the pad body, the holding portion having an L-shaped first recess and the steering wheel pad having a second recess located between the pad body and the holding portion, the first recess being curved away from the second recess, the mold including a pair of first and second molds, one of the first and second molds having a pair of first core members provided with a first portion for forming the first recess, a pair of second core members for forming an inner portion of the pad, and a main body, the method comprising the steps of:

injecting a molten resin into a mold cavity defined upon closing contact between the first and second molds;

curing the molten resin to form the steering wheel pad;

separating the first and second molds and holding the steering wheel pad in said one of the first and second molds;

extending the first and second core members from the main body of said one of the first and second molds together with the steering wheel pad along an extending direction to separate part of the holding portion, which is located at the opposite side of the second recess and which is in contact with a mold surface of the main body, from the mold surface;

sliding the first core member in a direction perpendicular to the extending direction and resiliently deforming the holding portion to remove the first portion from the first recess while holding the pad with the second core member; and removing the pad from the second core member.

2. The method according to claim 1, wherein the extending and sliding steps are carried out simultaneously.

3. The method according to claim 1, wherein the steering wheel pad has at least one pair of holding portions.

4. The method according to claim 1, wherein the main body of said one of the first and second molds forms a surface opposed to the first recess of the holding portions on the opposite side of the second recess.

5. The method according to claim 1, wherein a second portion of the second core member defines a surface for forming the second recess.

6. The method according to claim 1, wherein the removing step enables the removal of the second portion from the second recess by resiliently deforming the holding portion.

7. The method according to claim 1, wherein in the sliding step, the second core member prevents the holding portion from moving inward.

* * * * *